United States Patent
Gaufin et al.

(10) Patent No.: US 11,130,482 B2
(45) Date of Patent: Sep. 28, 2021

(54) BRAKE CHAMBER STROKE SENSOR

(71) Applicant: TSE Brakes, Inc., Cullman, AL (US)

(72) Inventors: Carl Gaufin, Madison, AL (US); Will Drake, Cullman, AL (US)

(73) Assignee: TSE BRAKES, INC., Cullman, AL (US)

( * ) Notice: Subject to any disclaimer, the term of this patent is extended or adjusted under 35 U.S.C. 154(b) by 139 days.

(21) Appl. No.: 16/451,536

(22) Filed: Jun. 25, 2019

(65) Prior Publication Data

US 2020/0001853 A1 Jan. 2, 2020

Related U.S. Application Data

(60) Provisional application No. 62/692,432, filed on Jun. 29, 2018.

(51) Int. Cl.
| | |
|---|---|
| *F16D 66/02* | (2006.01) |
| *B60T 17/22* | (2006.01) |
| *B60T 13/10* | (2006.01) |
| *F16D 66/00* | (2006.01) |
| *G01D 5/14* | (2006.01) |

(52) U.S. Cl.
CPC ............ *B60T 17/221* (2013.01); *B60T 13/10* (2013.01); *F16D 66/00* (2013.01); *F16D 66/028* (2013.01); *G01D 5/14* (2013.01); *F16D 2066/003* (2013.01); *F16D 2066/006* (2013.01)

(58) Field of Classification Search
CPC ..... F16D 66/026; F16D 66/027; F16D 66/028
See application file for complete search history.

(56) References Cited

U.S. PATENT DOCUMENTS

| | | | | |
|---|---|---|---|---|
| 2,873,436 | A | * | 2/1959 | Avrea ...................... B60T 17/22 340/453 |
| 2,912,536 | A | * | 11/1959 | Hoch ...................... B60T 17/22 200/83 R |
| 4,642,603 | A | * | 2/1987 | Martinez, Jr. .......... B60Q 1/441 188/1.11 L |

(Continued)

FOREIGN PATENT DOCUMENTS

| | | |
|---|---|---|
| CN | 204020870 U | 12/2014 |
| DE | 4409351 A1 * | 9/1995 ............. F16D 65/28 |

(Continued)

OTHER PUBLICATIONS

EPO translation, DE 4409351. (Year: 1995).*

(Continued)

*Primary Examiner* — Thomas J Williams
(74) *Attorney, Agent, or Firm* — Levenfeld Pearlstein, LLC (57) ABSTRACT

A brake chamber includes a chamber housing having an end, a push rod configured for reciprocal movement in the chamber housing in a first direction and a second direction over a stroke distance, a return spring disposed in the chamber housing configured to urge the push rod in the second direction and a sensor assembly having a sensor and a magnet movable relative to the sensor with movement of the push rod. The sensor is configured to detect a magnetic field strength of the magnet and output sensor data representative of the detected magnetic field strength. The sensor assembly is configured to determine a position of the push rod based on the sensor data over the entire stroke distance.

6 Claims, 8 Drawing Sheets

(56) References Cited

U.S. PATENT DOCUMENTS

| | | | |
|---|---|---|---|
| 6,255,941 B1 | 7/2001 | Osterman et al. | |
| 6,352,137 B1 * | 3/2002 | Stegall | F16D 65/28 188/1.11 E |
| 6,595,045 B1 * | 7/2003 | Fuglewicz | B60T 17/08 73/129 |
| 6,888,451 B1 * | 5/2005 | Plantan | B60T 17/085 188/1.11 E |
| 6,891,468 B2 * | 5/2005 | Koenigsberg | B60T 8/885 303/20 |
| 7,014,016 B2 * | 3/2006 | Morris | F16D 66/00 188/1.11 E |
| 7,555,375 B2 * | 6/2009 | Pettersson | B60T 17/221 188/1.11 L |
| 9,441,692 B2 * | 9/2016 | Schaefer | F16D 66/025 |
| 9,482,301 B2 * | 11/2016 | Lamkin | F16D 55/40 |
| 10,941,826 B2 * | 3/2021 | Muniraju | F16D 66/027 |
| 2003/0024773 A1 | 2/2003 | Goncalves et al. | |
| 2011/0308897 A1 | 12/2011 | Wallace et al. | |

FOREIGN PATENT DOCUMENTS

| | | | | |
|---|---|---|---|---|
| EP | 2708771 B1 * | 4/2017 | | F16D 66/026 |
| EP | 3626566 A1 * | 3/2020 | | B60T 17/22 |
| GB | 1282835 A * | 7/1972 | | F16D 66/025 |

OTHER PUBLICATIONS

Dialog translation, CN 204020870. (Year: 2014).*
International Search Report and Written Opinion issued by ISA/EPO in connection with PCT/US2019/039283 dated Oct. 4, 2019.
International Preliminary Report on Patentability issued by ISA/EPO in connection with PCT/US2019/039283 dated Dec. 29, 2020.

* cited by examiner

BRAKE CHAMBER STROKE SENSOR

CROSS-REFERENCE TO RELATED APPLICATION DATA

This application claims the benefit of and priority to Provisional U.S. Patent Application Ser. No. 62/692,432, filed Jun. 29, 2018, titled BRAKE CHAMBER STROKE SENSOR, the entirety of which is incorporated herein by reference.

BACKGROUND

The present disclosure relates generally to a brake chamber having a sensor for detecting brake chamber stroke.

A known brake chamber in a commercial vehicle includes a push rod configured for stroking movement within the chamber to actuate a brake component. In the known brake chamber, a rated maximum service stroke of the brake chamber is specified by the manufacturer, typically 2.5 or 3.0 inches. In a well-maintained and properly adjusted brake system, a service stroke of the chamber will be considerably less than the rated maximum service stroke. However, if the brake system is not properly adjusted as the brake components wear, the service stroke may approach the rated maximum service stroke, negatively affecting performance of the brake chamber and the brake system. Thus, it is desirable to measure a stroke distance of the brake chamber, i.e., the distance the push rod moves from a start to an end of the stroke, for maintenance purposes.

To this end, it is known to include a sensor in the brake chamber for measuring a stroke distance. In such a sensor, a part to be detected may be disposed on a head of the push rod, and the sensor may be positioned at end of the chamber. Thus, the part to be detected is movable with the push rod, relative to the sensor. In a known brake chamber, the sensor is a magnetic sensor and the part to be detected is a magnet.

However, the known sensors may not be able to provide measurements when the part to be detected is approaching a maximum distance from the sensor near a beginning of a stroke cycle. Thus, it is difficult to obtain accurate measurements over the entire stroke cycle in the chamber.

In addition, it is difficult to determine a number of stroke cycles to which a brake chamber has been subjected. Thus, maintenance or inspection schedules are generally set at predetermined time intervals. However, if a brake chamber was subjected to heavy use, unsuitable levels of wear may go undetected before regular maintenance or inspection. Conversely, if a brake chamber was subjected to light use, resources may be unnecessarily expended to conduct a regular inspection when maintenance is not required.

Accordingly, it is desirable to provide a brake chamber having a sensor assembly configured to detect brake chamber stroke over an entire stroke distance. It is also desirable to provide a brake chamber having a sensor assembly configured to monitor a number of stroke cycles performed. Further, it may be desirable provide a sensor assembly configured to determine a condition of the brake chamber based on the detected chamber stroke.

SUMMARY

According to one embodiment, a brake chamber includes a chamber housing enclosing an internal chamber and having an end, a push rod configured for reciprocal movement in the chamber housing in a first direction and a second direction over a stroke distance, a return spring disposed in the chamber housing configured to urge the push rod in the second direction, and a sensor assembly having a sensor and a magnet movable relative to the sensor with movement of the push rod. The sensor is configured to detect a magnetic field strength of the magnet and output sensor data representative of the detected magnetic field strength. The sensor assembly is configured to determine a position of the push rod based on the sensor data over the entire stroke distance.

These and other features and advantages of the present invention will be apparent from the following detailed description, in conjunction with the appended claims.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
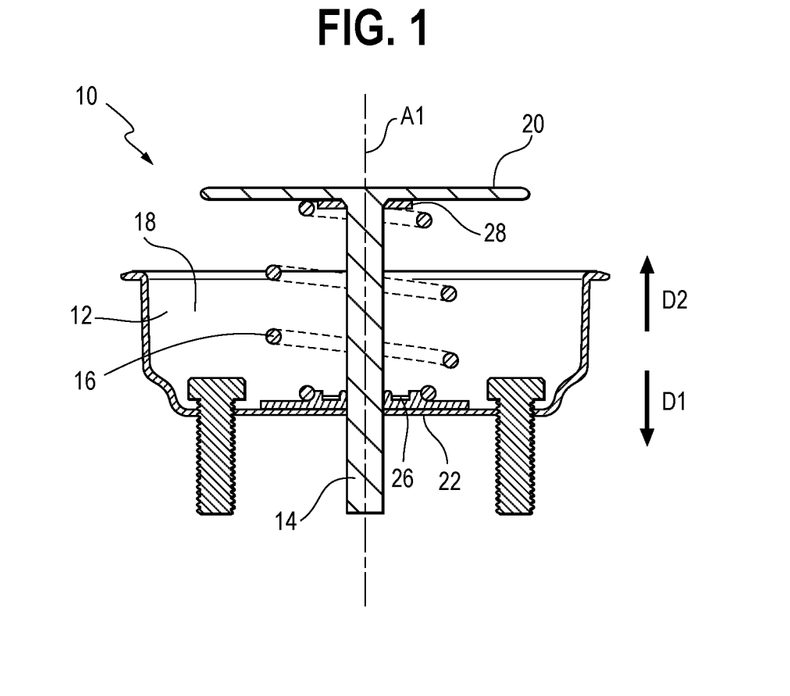
FIG. 1 is a sectional view of a brake chamber, according to an embodiment.
Figure 2:
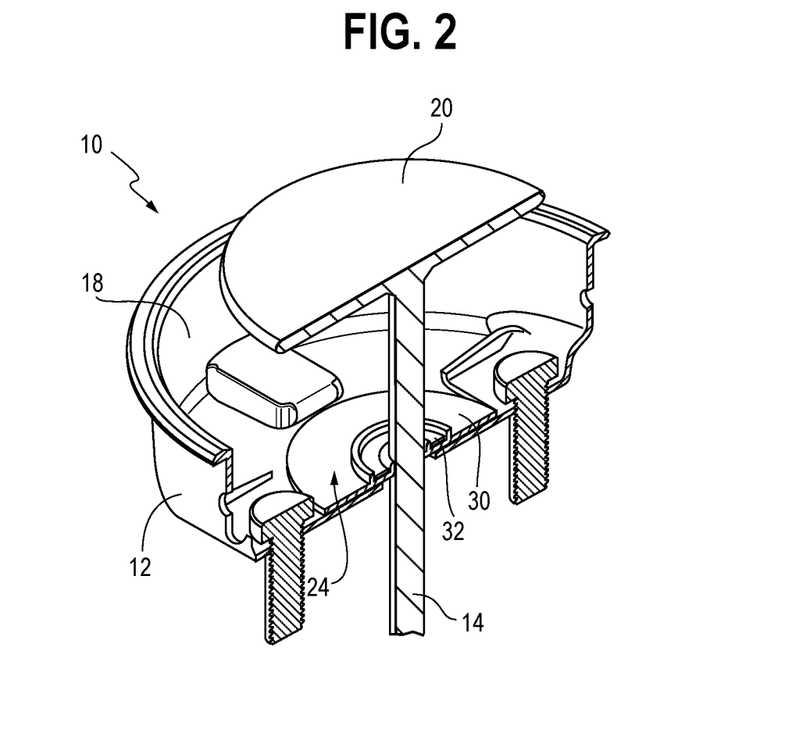
FIG. 2 is a perspective sectional view of the brake chamber, according to an embodiment.

FIG. 1 is a sectional view of a brake chamber 10 according to an embodiment, and FIG. 2 is a perspective sectional view of the brake chamber 10, according to an embodiment. Referring to FIGS. 1 and 2, the brake chamber 10 generally includes a chamber housing 12, a push rod 14, and a return spring 16, such as a coil spring. The return spring 16 is omitted in FIG. 2, for clarity.

The chamber housing 12 generally encloses a service chamber 18. The push rod 14 is configured for reciprocal movement within the chamber housing 12 along a longitudinal axis A1 in a first direction D1 and second direction D2 over a stroke distance. A portion of the push rod 14 extends outwardly from the chamber housing 12 through an opening. Reciprocating movement of the push rod 14 actuates a brake component (not shown).

The push rod 14 includes a push rod plate 20 disposed within the chamber housing 12. The brake chamber 10 also includes a diaphragm (omitted from FIGS. 1 and 2 for clarity). The push rod plate 20 may be disposed in contact with the diaphragm such that pressurization of the diaphragm causes the push rod 14 to move in the first direction D1, in a fore stroke.

The return spring 16 is disposed between an end 22 of the chamber housing 12 and the push rod plate 20, and urges the push rod 14 to move in the second direction D2 opposite to the first direction D1, in a return stroke.

In operation, the diaphragm is pressurized, causing a force to be applied on the push rod plate 20 to move the push rod 14 in the first direction D1, against a spring force of the return spring 16. When the diaphragm is depressurized, the spring force of the return spring 16 urges the push rod 14 to move in the second direction D2.

Figure 3:
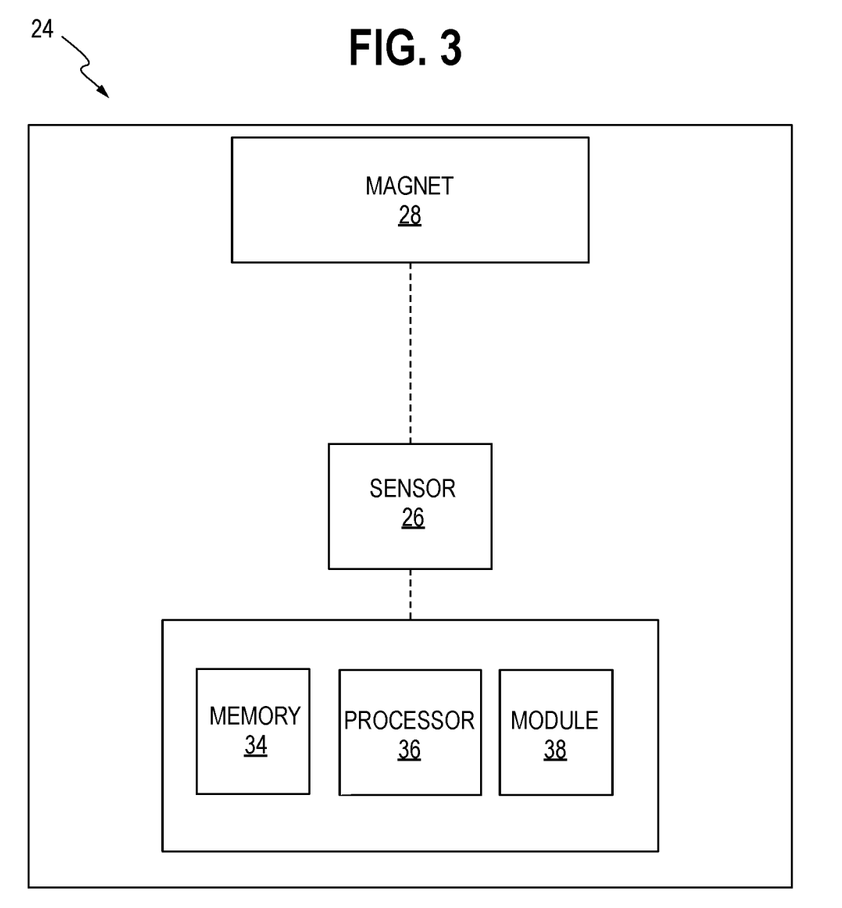
FIG. 3 is a schematic block diagram of a sensor assembly, according to an embodiment.

The brake chamber 10 also includes a sensor assembly 24. FIG. 3 is a schematic block diagram of the sensor assembly 24 according to an embodiment. Referring to FIGS. 1-3, the sensor assembly 24 includes a sensor 26, a magnet 28 and a sensor housing 30. The sensor 26 is configured to detect an input, and output sensor data representative of the detected input. In one embodiment, the sensor 26 may be a magnetic sensor configured to detect a magnetic field strength of the magnet 28 and output a value of the detected strength. In one embodiment, the sensor assembly 24 includes a plurality of sensors 26.

The sensor assembly 24 may also include a printed circuit board ("PCB") 32, to which the sensor 26 is operably connected. The PCB 32 includes, for example, a memory 34 configured to store program instructions, a processor 36, such as a microprocessor, configured to execute the program instructions, and a communication module 38.

Referring still to FIGS. 1-3, the sensor 26 and PCB 32 may be disposed on or in the sensor housing 30. The sensor housing 30 may be made of plastic or other similar, suitable material. In one embodiment, the sensor 26 is disposed at the end 22 of the chamber housing 12. The magnet 28 may be disposed at the push rod plate 20. For example, the magnet 28 may be embedded in the push rod plate 20. In another embodiment, the magnet 28 may be disposed on an upper or lower surface of the push rod plate 20. In another embodiment, the arrangement of the sensor 26 and the magnet 28 may be reversed, such that the sensor 26 is disposed on the push rod plate 20 and the magnet 28 is disposed at the end 22 of the chamber housing 12.

A strength of the magnetic field detected by the sensor 26 varies based on a proximity of the magnet 28 to the sensor 26. For example, the detected strength is weaker when the magnet 28 is positioned farther from the sensor 26 and stronger when the magnet 28 is positioned nearer to the sensor 26. Thus, the detected magnetic field is weakest when the push rod 14 is at a start position of the fore stroke (i.e., a zero stroke position), which corresponds to an end position of the return stroke. Conversely, the detected magnetic field is strongest when the push rod 14 is at an end position of the fore stroke, which corresponds to a start position of the return stroke.

The sensor 26 may detect the strength of the magnetic field at any desired time interval or in response to a known position of the push rod 14, push rod plate 20, and the magnet 28. For example, the sensor 26 may detect the magnetic field strength substantially continuously during operation of the brake chamber 10. In one embodiment, the sensor 26 may detect the magnetic field strength at a start of the fore stroke, an end of the fore stroke, a start of the return stroke and/or an end of the return stroke. A difference or change in the magnetic field may be detected or determined as well.

In normal operation, a position of the magnet 28 relative to the sensor 26 is substantially the same at the start of the fore stroke and end of the return stroke. The position of the magnet 28 relative to the sensor 26 is also substantially the same at the end of the fore stroke and start of the return stroke.

Figure 4:
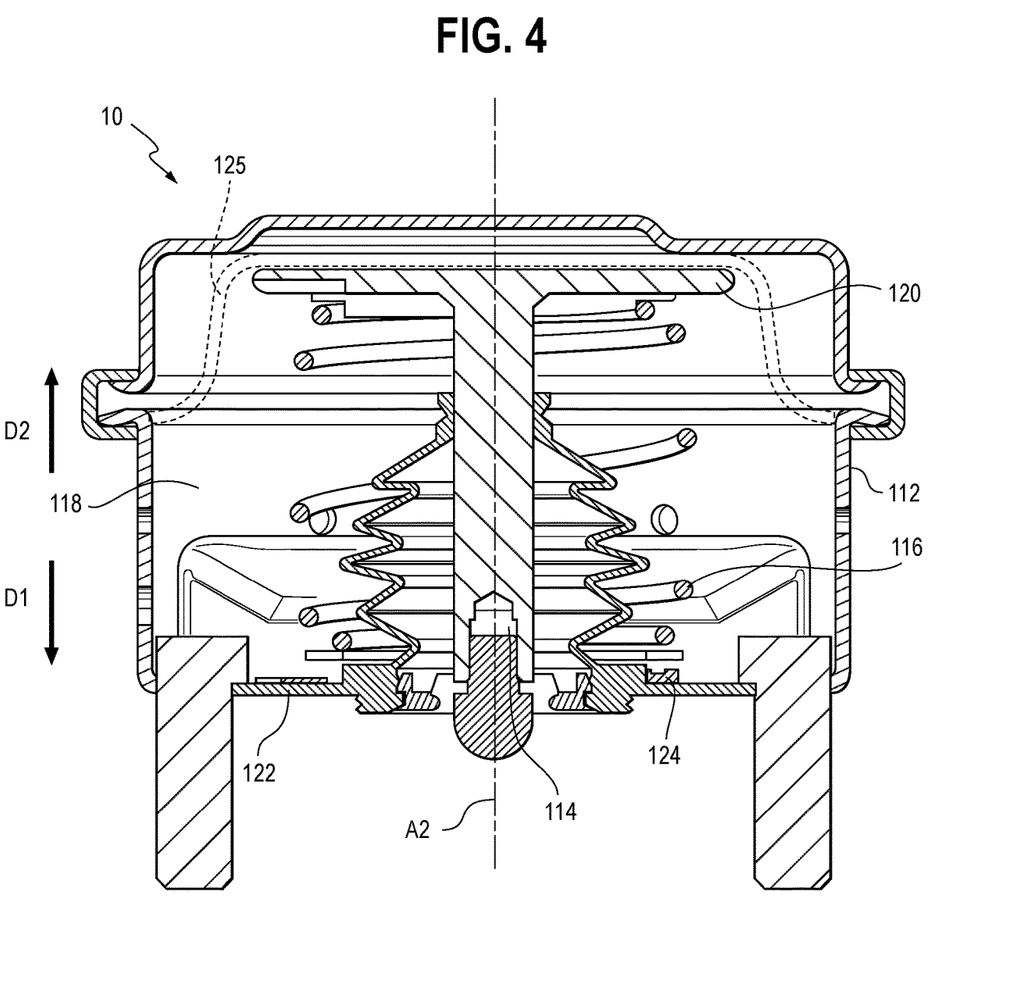
FIG. 4 is a sectional view of the brake chamber, according to another embodiment.
Figure 5:
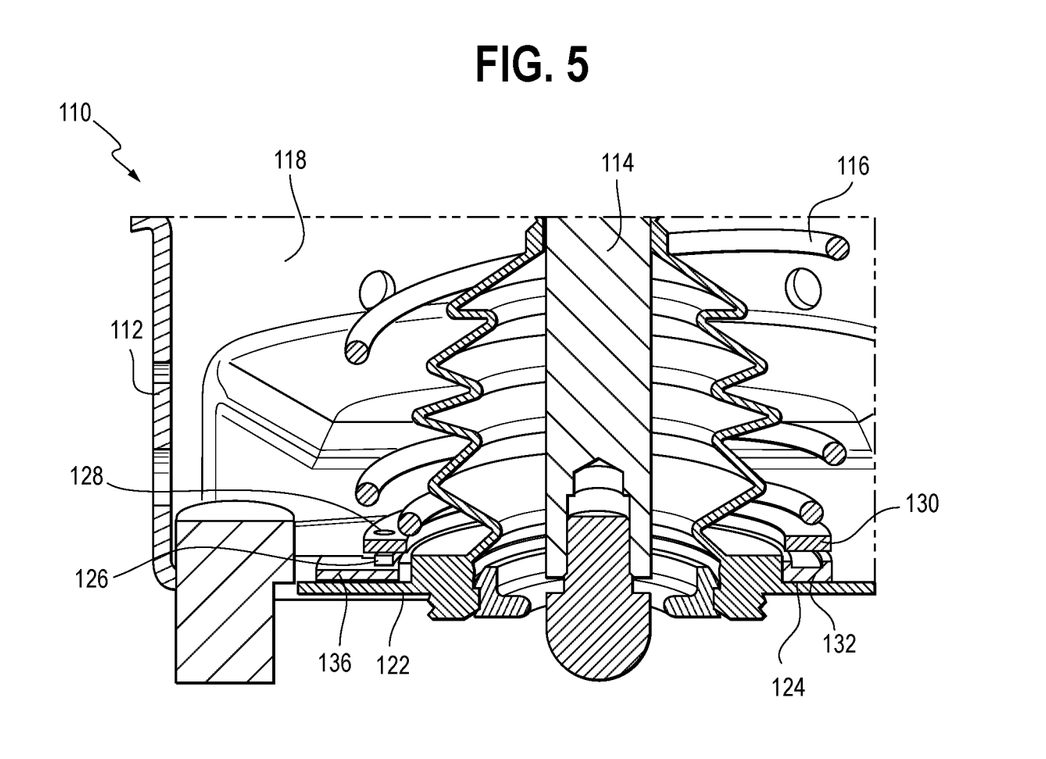
FIG. 5 is a partial, sectional view of the brake chamber of FIG. 4, according to an embodiment.

FIGS. 4-9 show a brake chamber 110 according to another embodiment described herein. Referring to FIGS. 4 and 5, the brake chamber 110 generally includes a chamber housing 112, a push rod 114, a return spring 116 and a service chamber 118 which substantially correspond, respectively, to the chamber housing 12, the push rod 14, the return spring 16 and the service chamber 18 above. Thus, further description of these features may be omitted below except where these features differ from those described in previous embodiments.

FIG. 4 is a sectional view of the brake chamber 110, according to an embodiment. Referring to FIG. 4, a diaphragm 125 is disposed in the chamber housing 112. The diaphragm 125 is configured to operate in substantially the same manner as the diaphragm described in the previous embodiments, to move the push rod 114 and push rod plate 120 in the first direction D1 along an axis A2, in a fore stroke.

FIG. 5 is a partial, sectional view of the brake chamber 110, according to an embodiment. Referring to FIGS. 4 and 5, the brake chamber 110 further includes a sensor assembly 124 disposed adjacent to an end 122 of the chamber housing 112. In one embodiment, a base end of the return spring 116 may be seated on the sensor assembly 124, or otherwise positioned relative to the sensor assembly 124 such that a compressive force applied to the return spring 116 causes the return spring 116 to apply a force to the sensor assembly 124.

Figure 6:
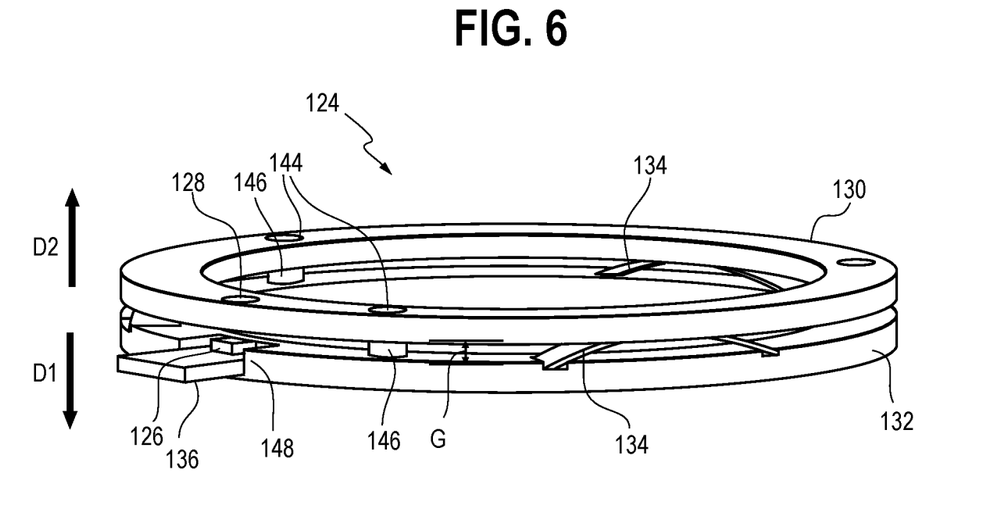
FIG. 6 is a perspective view of a sensor assembly according to another embodiment.

FIG. 6 is a perspective view of the sensor assembly 124 according to an embodiment. Referring to FIGS. 4-6, the sensor assembly 124 includes a sensor 126, a magnet 128, a top plate 130, a base plate 132, at least one resilient member 134 disposed between the top plate 130 and the base plate 132, and a printed circuit board 136 ("PCB") operably connected to the sensor 126. The return spring 116 may be seated on the top plate 130 such that the return spring 116 applies a force to the top plate 130 when compressed due to movement of the push rod 114 in the first direction D1.

Figure 7:
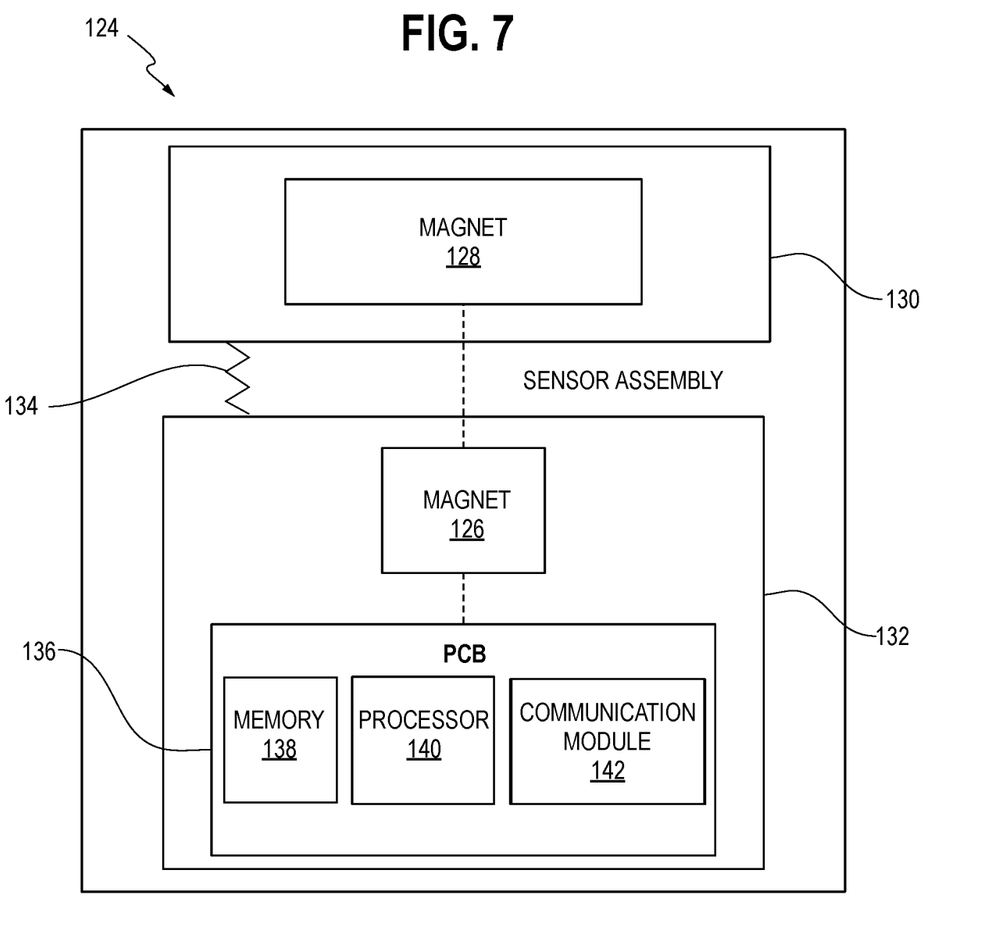
FIG. 7 is a schematic block diagram of the sensor assembly of FIG. 6, according to an embodiment.

FIG. 7 is a schematic block diagram of the sensor assembly 124, according to an embodiment. Referring to FIG. 7, the PCB 136 may include a memory 138 configured to store program instructions, a processor 140, such as a microprocessor, configured to execute the program instructions, and a communication module 142.

Referring to FIGS. 4-7, in one embodiment, the top plate 130 and the base plate 132 may by substantially ring-shaped and spaced apart from one another by a distance indicated by gap G. The top plate 130 and base plate 132 may extend in substantially parallel planes relative to one another. The resilient member 134 may be a spring, such as a leaf spring, and is configured to urge the top plate 130 away from the base plate 132, or vice versa, so as to form the gap G. In one embodiment, the top plate 130 and the base plate 132 may be sized substantially the same as one another.

In one embodiment, the top plate 130 is made from a non-conductive material. One or more guide openings 144 may be formed in the top plate 130. The magnet 128 may be mounted on or embedded in the top plate 130. The return spring 116 may be seated either directly or indirectly on the top plate 130.

The base plate 132 may include one or more top plate guides 146. In one embodiment, the top plate guides 146 are formed as posts configured for receipt in corresponding guide openings 144 of the top plate 130. In this manner, the one or more guide openings 144 and corresponding one or more top plate guides 146 may substantially hold the top plate 130 against rotation relative to the base plate 132 while permitting relative axial movement.

The base plate 132 may further include a notch 148. In one embodiment, the sensor 126 and the PCB 136 may be disposed in the notch 148. The sensor 126 and the magnet 128 are substantially aligned in an axial direction. Said differently, the magnet 128 and the sensor 126 may be positioned at substantially the same angular position on top plate 130 and the base plate 132, respectively.

Figure 8:
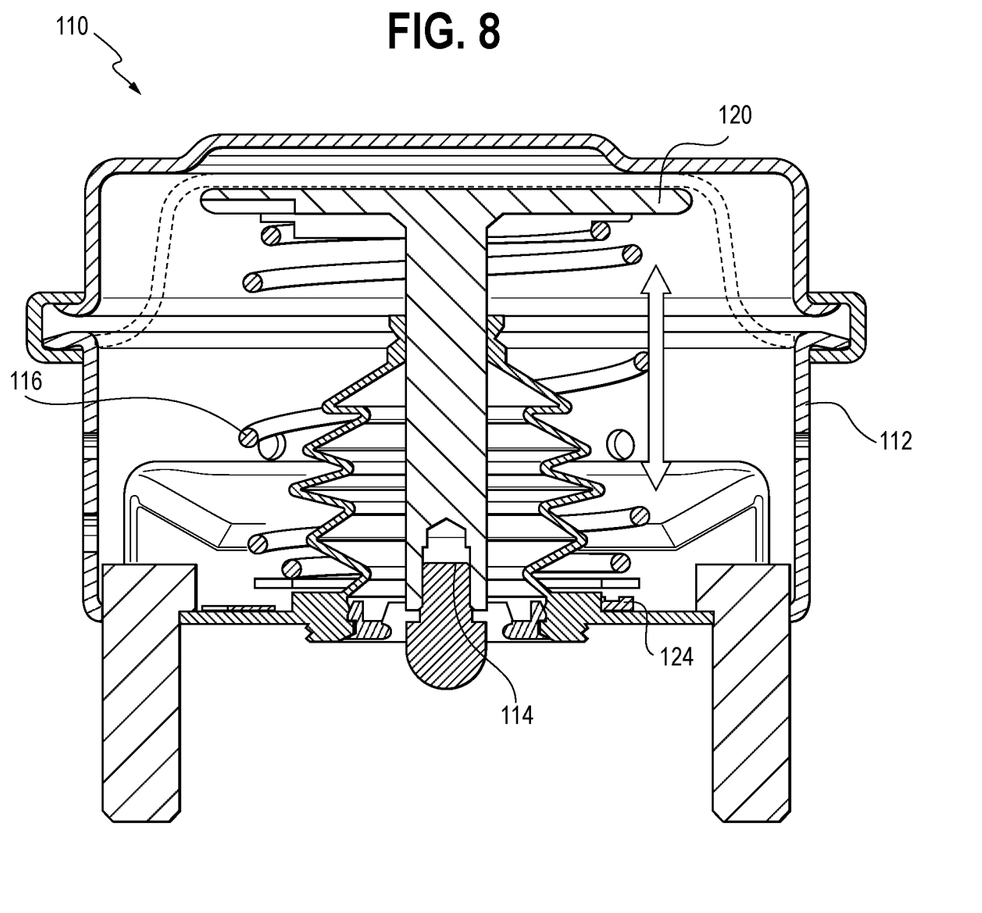
FIG. 8 is another sectional view of the brake chamber of FIG. 4, according to an embodiment.

FIG. 8 is another sectional view of the brake chamber 110 according to an embodiment. Referring to FIG. 8, the push rod 114 is configured for reciprocal movement as indicated by the double arrow. Movement of the push rod 114 in the first direction D1 (FIG. 4) causes the push rod plate 120 to apply a compressive force to the return spring 116. The return spring 116 applies a force to the top plate 130 to move the top plate 130 generally in the first direction D1 (FIG. 6) against a spring force of the resilient member 134. Accordingly, the magnet 128 is moved toward the sensor 126. In one embodiment, the top plate 130 may be moved toward the base plate 132 until the push rod 114 hits a mechanical stop, or until the brake system provides enough force to balance the output chamber force, thereby ending the fore stroke.

Figure 9:
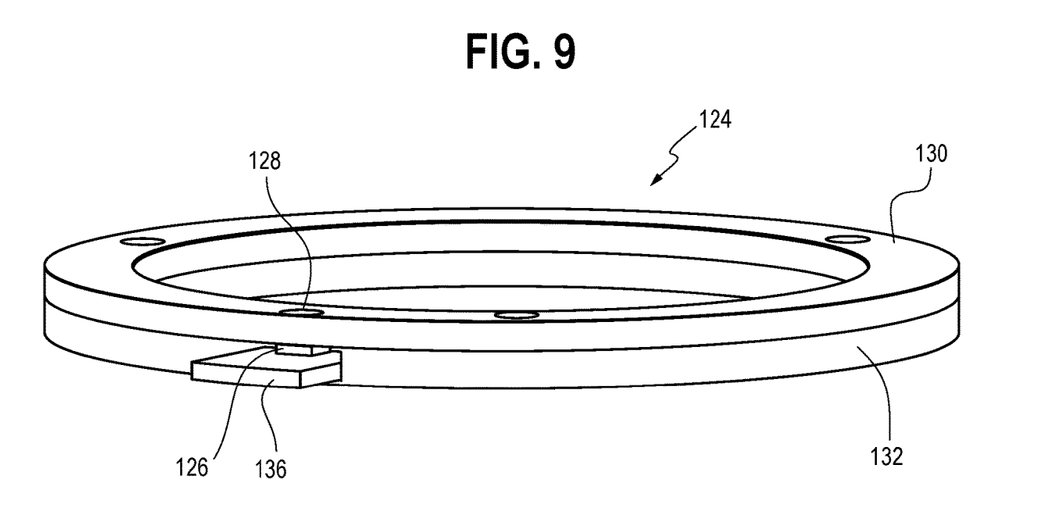
FIG. 9 is another perspective view of the sensor assembly of FIG. 6, according to an embodiment.

FIG. 9 is a perspective view of the sensor assembly 124 when the force is applied to the top plate 130 from the return spring 116 (not shown in FIG. 7) to compress the resilient member 134. Referring to FIG. 9, in one embodiment, the top plate 130 may be brought into, or nearly into contact with the base plate 132. In another embodiment, the positions of the sensor 126 and the magnet 128 may be reversed, such that the sensor 126 is disposed on the top plate 130 and the magnet 128 is disposed on the base plate 132. Accordingly, the sensor 126 may be moved with the top plate 130 toward and away from the magnet 128 of the base plate 132. In one embodiment, the positions of the top plate 130 and base 132 may be reversed such that the return spring 116 applies a force to the base plate 132 to move the base plate 132 toward the top plate 130.

In the embodiments shown in FIGS. 4-9 and discussed above, the sensor 126 is configured to detect a magnetic field strength of the magnet 128. The magnet 128 may be a small magnet 128 because, even at a maximum distance, the magnet 128 is positioned in relatively close proximity to the sensor 126. The detected magnetic field strength is strongest when the magnet 128 and top plate 130 are positioned nearest to the sensor 126 and base plate 132. Conversely, the detected magnetic field strength is weakest when the magnet 128 and top plate 132 are position farthest from the sensor 126 and the base plate 132. The nearest position substantially corresponds to a position of the push rod 114 at an end of the fore stroke or start of the return stroke. The farthest position substantially corresponds to a position of the push rod 114 at a start of the fore stroke or end of the return stroke.

Similar to the sensor assembly 24 described in the embodiments above with respect to FIGS. 1-3, the sensor assembly 124 may detect the magnet field strength at any suitable time interval and/or position of the push rod 114.

In the sensor assembly 124, misalignments between the sensor 126 and magnet 128 may be substantially avoided due to the relatively close proximity of the sensor 126 to the magnet 128 and interaction of the top plate guides 146 and the openings 144, even at the start of the fore stroke or end of the return stroke. In addition, the sensor 126 may consistently and accurately detect the magnetic field strength of the magnet 128 at the start of the fore stroke and end of the return stroke due to the relatively close proximity. That is, the stroke may be monitored, measured, and/or detected over the entire stroke distance. Further, the sensor assembly 124 may have a relatively low profile so as to not interfere or limit the stroke of the push rod 114.

In the sensor assembly 124, a distance of the gap G between the top plate 130 and the base plate 132 may be correlated to a stroke distance of the push rod 114. For example, in one embodiment, the distance of the gap G may change at a fixed ratio with a distance moved by the push rod 114. Thus, in one embodiment, the distance traveled by the push rod 114 during a fore or return stroke may be determined based on a distance traveled by the top plate 130 relative to the base plate 132. In a non-limiting embodiment, the gap G may be approximately 0.1 inches at the beginning of a stroke. However, other distances are envisioned as well. For example, the gap G may be any distance over which the sensor 126 accurately detects the magnetic field strength of the magnet 128 over an entire stroke cycle of the brake chamber 10. For example, in other embodiments the gap G may be as large as, or larger than, 1.0 inches at the beginning of the stroke. Conversely, in other embodiments, the gap G may be less than 0.1 inches at the beginning of the stroke.

Further, in the embodiments above, the sensor assembly 24/124 may detect and count a number of brake stroke cycles. For example, the sensor assembly 24/124 may count a cycle as occurring when a detected magnetic field strength exceeds, then returns below, a predetermined threshold value, or conversely, when the detected magnetic field strength falls below, and then exceeds, a predetermined threshold value. Other suitable techniques for counting stroke cycles are envisioned, and the present disclosure is not limited to the examples above. The number of brake cycles may be stored in the memory 34/138 of the sensor assembly 24/124.

A condition of the brake chamber 10/110 may be determined based on the sensor data. For example, the sensor assembly 24/124 may analyze the sensor data to determine whether a detected magnetic field strength corresponds to an expected, baseline value within an acceptable threshold. For example, one or more baseline magnetic field strength values may be stored which correspond to the push rod 14/114 positioned at the start of the fore stroke, the end of the fore stroke, the start of the return stroke and the end of the return stroke. The baseline magnetic field strength values may be a same value at positions corresponding to the start of the fore stroke and the end of the return stroke. Similarly, the baseline magnetic field strength values may be another same value at positions corresponding to the end of the fore stroke and the start of the return stroke.

The sensor assembly 24/124 may analyze the sensor data by comparing one or more of the maximum and minimum detected magnetic field strength values for each cycle to maximum and minimum baseline magnetic field strength values. The sensor assembly 24/124 may determine whether the detected values are within a predetermined range of the respective baseline values. If the detected value falls outside of an acceptable range or threshold of a corresponding baseline value, the sensor assembly 24/124 may determine that the brake chamber 10/110 is in a condition where an inspection should be performed. A detected magnetic field strength falling outside of the predetermined range for a corresponding baseline value may indicate that the push rod 14/114 has not traveled an intended stroke distance, has not reached an intended position, or has traveled beyond an intended position (thereby increasing stroke distance), such as the intended start and end positions for the fore stroke or the start and end positions for the return stroke. In response to determining the condition in the manner described above, a notification may be provided to a technician or operator regarding the determined condition. Other conditions may be determined based on the sensor data as well. For example, a broken, worn or failed power spring, a failed or worn return spring, or improper positioning of the push rod 14/114 at the start or end of stroke, may be determined. Similarly, a notification may be provided to a technician or operator regarding such determinations.

It is also envisioned that the sensor data may be converted into a different unit, such as a length or distance unit, and the various determinations above may be based on an analysis of detected and baseline distances or lengths. It is further envisioned that the various analyses, determinations and the like described above may be carried out at an external device, such as a vehicle telematics system, based on the sensor data.

In one embodiment, the sensor assembly 24/124 may also store digital identification information in the memory 34/138, which may be obtained by a technician. Accordingly, a technician may readily associate maintenance information or history with a particular brake chamber 10/110. In addition, it is envisioned that an inspector or technician may be able to readily determine a rated stroke length of the brake chamber 10/110 by way of the systems and method described herein. The brake chamber 10/110 of the embodiments above may be used in disc brake and drum brake applications. It is further envisioned that other types of sensors may be used in any of the above-discussed embodiments.

Features from any one of the embodiments described above may be implemented in, combined or used together with, or replace features from any of the other embodiments described above.

It is understood the various features from any of the embodiments above are usable together with the other embodiments described herein.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular. In addition, it is understood that terminology referring to orientation of various components, such as "upper" or "lower" is used for the purposes of example only, and does not limit the subject matter of the present disclosure to a particular orientation.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A brake chamber comprising:
   a chamber housing having an end;
   a push rod configured for reciprocal movement in the chamber housing in a first direction and a second direction over a stroke distance, the push rod having a push rod plate at an end thereof;
   a return spring disposed in the chamber housing configured to urge the push rod in the second direction; and
   a sensor assembly comprising a sensor and a magnet movable relative to the sensor with movement of the push rod, the sensor assembly including a sensor housing having inner and outer upturned lips,
   wherein the sensor is configured to detect a magnetic field strength of the magnet and output sensor data representative of the detected magnetic field strength, and
   wherein the sensor assembly is configured to determine a position of the push rod based on the sensor data continuously over the entire stroke distance,
   wherein one of the sensor and the magnet is positioned on the push rod plate and the other of the sensor and the magnet is positioned at an end of the chamber housing,
   wherein the sensor is positioned between the sensor housing upturned lips and extends upwardly a distance less than the upturned lips, and
   wherein the sensor assembly is configured to determine one or both of a stroke distance of the push rod and a number of brake cycles based on the sensor data.

2. The brake chamber of claim 1, wherein the sensor is positioned at the end of the chamber housing and the magnet is disposed on the push rod plate.

3. A brake chamber comprising:
   a chamber housing having an end;
   a push rod configured for reciprocal movement in the chamber housing in a first direction and a second direction over a stroke distance;
   a return spring disposed in the chamber housing configured to urge the push rod in the second direction; and
   a sensor assembly comprising a sensor and a magnet movable relative to the sensor with movement of the push rod, the sensor assembly comprising a top plate, a base plate and at least one resilient member disposed between the top plate and the base plate,
   wherein the sensor is configured to detect a magnetic field strength of the magnet and output sensor data representative of the detected magnetic field strength,
   wherein the sensor assembly is configured to determine a position of the push rod based on the sensor data continuously over the entire stroke distance,
   wherein the sensor is positioned on one of the top plate and the base plate and the magnet is positioned on the other of the top plate and the base plate,
   wherein the base plate includes one or more top plate guides and wherein the top plate includes corresponding one or more guide openings for receiving the one or more top plate guides to maintain the top plate and base plate rotationally fixed relative to one another, and
   wherein movement of the push rod in the first direction causes the return spring to apply a force to the top plate and move the top plate toward the base plate.

4. The brake chamber of claim 3, wherein the magnet is disposed on the top plate and the sensor is disposed on the base plate.

5. The brake chamber of claim 3, wherein the magnet is disposed on the base plate and the sensor is disposed on the top plate.

6. The brake chamber of claim 3, wherein the top plate moves away from the base plate under a spring force of the resilient member when the push rod is moved in the second direction by the return spring.

* * * * *